United States Patent [19]
Hubbard

[11] Patent Number: 5,320,030
[45] Date of Patent: Jun. 14, 1994

[54] PANCAKE MAKER

[76] Inventor: Carmelita Hubbard, 124 Westview St., Apt. 12, Dorchester, Mass. 02124

[21] Appl. No.: 23,388

[22] Filed: Feb. 26, 1993

[51] Int. Cl.$^5$ .............................................. A47J 37/10
[52] U.S. Cl. ....................................... 99/423; 99/374; 99/432; 99/448; 219/385; 219/386; 219/477; 219/478
[58] Field of Search ................ 99/374, 377, 378, 389, 99/391, 392, 426, 432, 448, 422, 423, 424; 219/385, 386, 476–478

[56] References Cited

U.S. PATENT DOCUMENTS

| | | | |
|---|---|---|---|
| 1,228,956 | 6/1917 | Noonan | 99/392 |
| 1,814,942 | 7/1931 | Mabey | 99/374 |
| 2,945,598 | 7/1960 | Rallis | 99/448 |
| 3,006,292 | 10/1961 | Hilgers | 99/448 |
| 3,683,150 | 8/1972 | Kehl et al. | 99/423 |
| 4,112,916 | 9/1978 | Guibert | 219/385 |
| 4,346,651 | 8/1982 | Schickedanz | 99/448 |

FOREIGN PATENT DOCUMENTS 17521 of 1929 Australia ................................ 99/391

Primary Examiner—Harvey C. Hornsby
Assistant Examiner—Mark Spisich
Attorney, Agent, or Firm—Gary E. Lambert

[57] ABSTRACT

A pancake maker in which several batter-filled containers are simultaneously placed within a heating device to make pancakes. All the resulting pancakes are uniformly shaped and cooked and can be quickly produced. This invention is applicable to the individual as well as the restaurant industry and greatly enhances the look, consistency, and quality of pancakes made.

5 Claims, 2 Drawing Sheets

PANCAKE MAKER

BACKGROUND OF THE INVENTION

This invention is concerned with making uniformly shaped and concurrently baked or cooked pancakes. Before the present invention, it was not possible to uniformly form pancake batter into desired portions for pancakes and cook said portions at the same time. This invention accomplishes this task and allows for the easy removal of the cooked pancakes from the invention.

SUMMARY OF THE INVENTION

It is an object of this invention to provide an apparatus to receive, form and heat a semi-liquid substance, such as pancake batter, to create a plurality of heated, symmetric, and hardened substances, such as pancakes, concurrently.

To achieve the foregoing and other objectives, and in accordance with the purposes of the present invention, a stand is equipped with a plurality of covered containers. These containers are movably connected to the stand and have removable covers. A semi-liquid substance is added to the containers, covered and inserted into the heating apparatus.

The heating apparatus contains a plurality of chambers in direct correlation to the number of containers. Each chamber has a heating element above and below. The filled containers, while positioned in the chambers, are subjected to heat on both sides and consequently, the substance is uniformly heated.

After the substance is sufficiently heated, the containers are extracted from the heating apparatus, the covers are removed and the substance separated from the container.

DESCRIPTION OF THE PREFERRED EMBODIMENT

Figure 1:
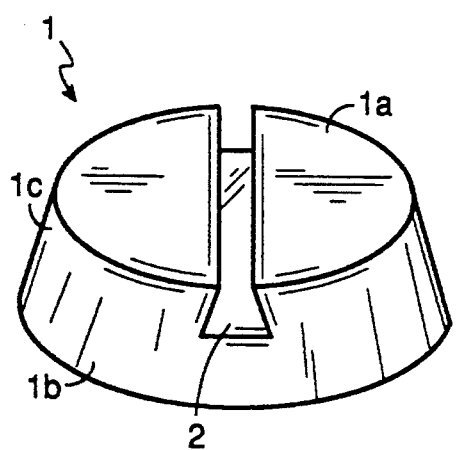
FIG. 1 is a view of a base used to support a stand.

Referring to FIG. 1 of the drawings, a support base shown generally at 1 contains a notched keyway 2 on the top surface 1a extending radially through the sides 1c of the base. The base is flat on the top and bottom surface 1b and the sides are tapered inward from the bottom to the top to increase stability and prevent overturning. The base can be made of a variety of materials sufficient to prevent overturning and should weigh at least seven pounds.

Figure 2:
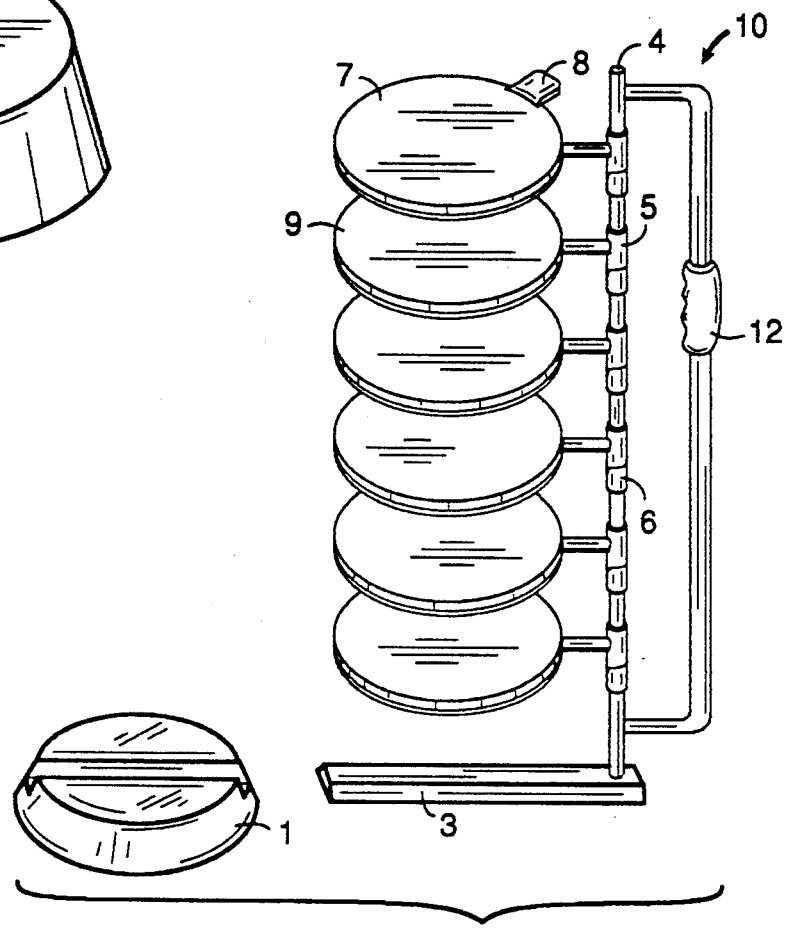
FIG. 2 is a view of a stand with movable containers along side said base.
Figure 3:
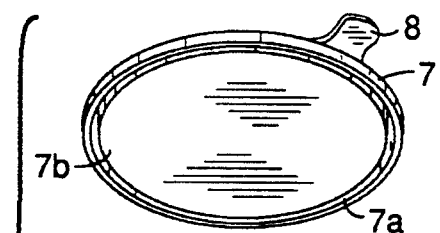
FIG. 3 depicts a container attached to a portion of the locking mechanism and the cover for said container.
Figure 3:
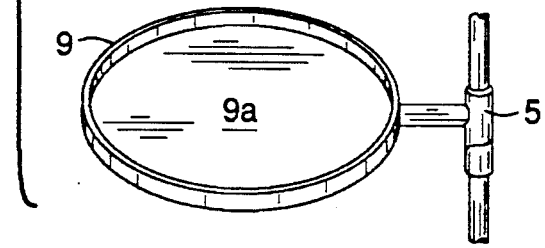

Referring now to FIG. 2, the stand 10 is equipped with a multiple number of containers 9, preferably six, as shown in FIG. 3. Each container is made from stamped sheet metal, preferably coated with a non-stick substance such as TEFLON in its inside portion 9a, and open at the top. Each container has a respective cover 7 which will completely encase the top portion of the container. The cover has a groove 7a extending circularly around the cover which allows the cover to fit securely on the edge of the top of the container. The cover is also made from stamped sheet metal and is preferably coated with a non-stick substance such as teflon on the inside portion 7b of the cover. Connected to the cover is a tab 8 designed in such a way that it will not interfere with the operation of any of the other containers or covers.

Figure 4:
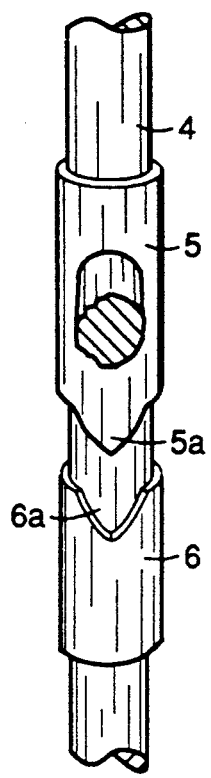
FIG. 4 illustrates the locking mechanism and its interaction between a rod.

FIG. 4 shows how each container is securely attached to rotating section 5, which moves and swivels freely around rod 4. The rod runs axially through the center of each rotating section and also forms handle 12. The stationary section 6 is rigidly attached to the rod, which is encased inside the stationary section. The rotating section contains a finger 5a which mates with slot 6a to insure proper alignment of all the containers on the rod. Sufficient space is left below each stationary section and each rotating section to allow for the rising action of the rotating section upon rotation.

Referring back to FIG. 1 and 2, the stand also contains a key 3 located at the bottom of the stand that allows the stand to be placed securely within the base by the insertion of the key into the keyway. When the stand is so inserted into the base, each container can be individually rotated out to ninety degrees to allow access to the container beneath it. When so configurated, the cover of each container can be removed and a liquid or semi-liquid substance such as pancake batter can be poured into the container and covered with the covers.

Figure 5:
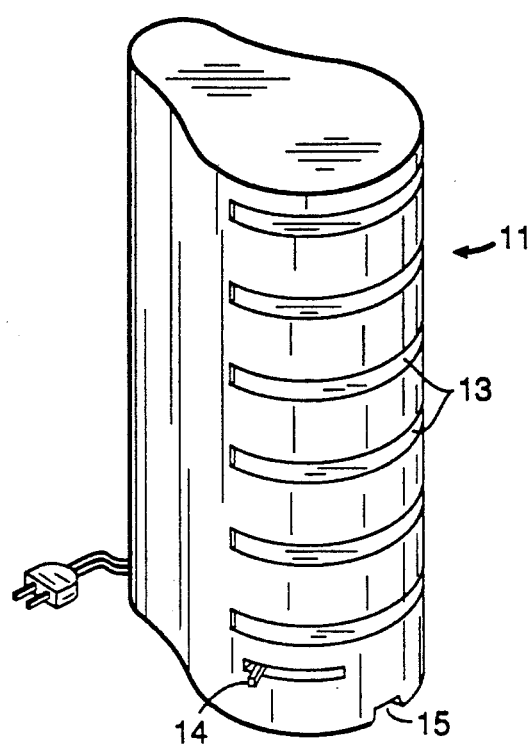
FIG. 5 is a view of the heating apparatus.

FIG. 5 shows a heating device 11 containing a plurality of chambers 13 in direct correlation to the number of containers on the stand. Passage 15 is of the same size and dimension as the keyway in the base and allows the key of the stand to fit securely in the heating device, thereby placing all the containers within their respective chambers and enabling a complete enclosure of the containers within the chambers.

Figure 6:
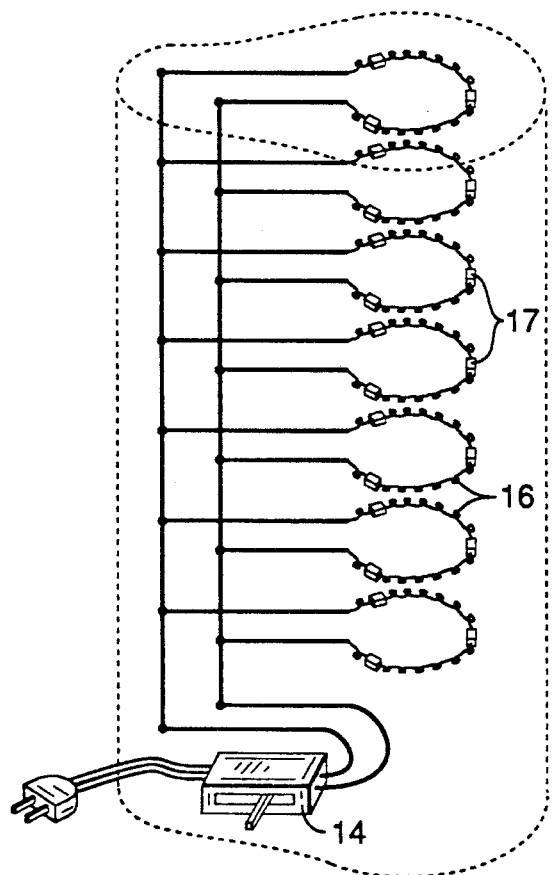
FIG. 6 is a schematic diagram illustrating the electrical wiring configuration within the heating apparatus.

FIG. 6 illustrates the electrical wiring configuration within the heating device, showing the multiple heating elements 16 located above and below each chamber and any inserted container. The elements can be coil-type resistive elements for rapid heating, and are wired in parallel for equal power distribution. The elements are isolated from the device by ceramic or similar insulators 17. Input power goes into a rheostatic device 14 which controls the power into the heating elements.

The liquid or semi-liquid substance in the containers is heated by inserting the filled containers with the covers into the chambers by using the handle of the stand. When the substance is sufficiently heated, the containers are extracted in the same manner, the covers removed, and the substance within the containers extracted.

Having set forth the general nature and specific embodiments of the present invention, the true scope is now particularly pointed out in the appended claims.

What is claimed is:

1. Apparatus for heating a semi-liquid substance, which comprises:
    a base having a top, bottom, sides and a keyway extending through the sides of said base, said sides tapered inward from the bottom of said base to the top of said base, said top and bottom of said base having a flat surface;
    a stand having a rod, said rod having a first end and a second end and further having a handle integral to said rod, said handle being parallel to said rod and having a gripping device whereby said stand can be held by a hand;

a key secured to said first end of said rod, said key having similar dimensions as said keyway so that said key can be securely engaged in said keyway of said base;

a plurality of locking mechanisms evenly placed along said rod, each said locking mechanism having a rotating section and a stationary section, said rotating section having a bore through which said rod is movably disposed and further having a finger, said stationary section having a cavity through which said rod is rigidly attached to said stationary section and further having a slot so that said finger mates with said slot;

a plurality of containers open at a top there of, each said container rigidly mounted to said rotating section of a respective locking mechanism;

a plurality of covers each for covering a respective container, each said cover having a groove extending circularly around an edge of said cover whereby said cover fits securely on the top of said container, said cover further having a tab to assist in the removal of said cover from said container; and a heating device having a plurality of chambers each adapted to receive one of said containers, said heating device having a passage so that said key can be inserted into said passage thereby engaging said containers within a respective chamber, said heating device further having a plurality of heating elements located above and below each of said chambers to heat any substance contained within said containers.

2. The apparatus of claim 1, wherein an inside portion of said containers and covers are coated with a non-stick surface.

3. The apparatus of claim 1, wherein said heating elements are coil-type resistive elements and are wired in parallel.

4. The apparatus of claim 3, wherein said heating elements are isolated from said heating device by a plurality of ceramic insulators.

5. The apparatus of claim 4, wherein input power is supplied to a rheostatic device whereby the power is controlled into said heating elements to vary the temperature of said chambers.

* * * * *